US009640996B2

United States Patent
Takehara et al.

(10) Patent No.: US 9,640,996 B2
(45) Date of Patent: *May 2, 2017

(54) ELECTRIC POWER SUPPLY SYSTEM

(71) Applicant: Panasonic Intellectual Property Management Co., Ltd., Osaka (JP)

(72) Inventors: Kiyotaka Takehara, Nara (JP); Kenji Nakakita, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/002,575

(22) Filed: Jan. 21, 2016

(65) Prior Publication Data
US 2016/0141880 A1 May 19, 2016

Related U.S. Application Data

(63) Continuation of application No. 13/516,766, filed as application No. PCT/JP2010/003305 on Dec. 20, 2010, now Pat. No. 9,246,333.

(30) Foreign Application Priority Data

Dec. 22, 2009 (JP) .................. 2009-291326

(51) Int. Cl.
*H02J 1/10* (2006.01)
*H02J 3/32* (2006.01)
(Continued)

(52) U.S. Cl.
CPC ............... *H02J 3/383* (2013.01); *H02J 3/32* (2013.01); *H02J 7/0068* (2013.01); *H02J 1/10* (2013.01);
(Continued)

(58) Field of Classification Search
CPC ........ H02J 1/10; H02J 3/00; H02J 3/32; H02J 3/46; H02J 3/383; Y02E 10/563; Y02E 10/566; Y02E 70/30; Y02B 10/14
(Continued)

(56) References Cited

U.S. PATENT DOCUMENTS

| 8,234,876 B2 | 8/2012 | Parsonnet et al. |
| 9,246,333 B2 | 1/2016 | Takehara et al. |
| 2009/0093916 A1 | 4/2009 | Parsonnet et al. |

FOREIGN PATENT DOCUMENTS

| JP | 2002-10499 | 1/2002 |
| JP | 2002-10500 | 1/2002 |
(Continued)

OTHER PUBLICATIONS

International Search Report and Written Opinion for corresponding International Application No. PCT/IB2010/003305 mailed May 31, 2011.
(Continued)

*Primary Examiner* — Hal Kaplan
(74) *Attorney, Agent, or Firm* — Renner, Otto, Boisselle & Sklar, LLP

(57) ABSTRACT

Disclosed is an electric power supply system which has: a common power source which stores and supplies a power via a local power grid; and a distributed power source which supplies a power to buildings and a surplus to the common power source. The electric power supply system further includes a first power meter measuring the amount of power supplied from a commercial power source, a second power meter measuring the amount of power received from and supplied to the common power source via the local power grid, and a distribution control device which distributes a
(Continued)

power from the common power source to the area based on the amounts of power as measured by the first power meter and the second power meter.

2 Claims, 2 Drawing Sheets

(51) Int. Cl.
  *H02J 3/46* (2006.01)
  *H02J 3/38* (2006.01)
  *H02J 7/00* (2006.01)
  *H02J 3/00* (2006.01)

(52) U.S. Cl.
  CPC . *H02J 3/00* (2013.01); *H02J 3/46* (2013.01); *Y02B 10/14* (2013.01); *Y02E 10/563* (2013.01); *Y02E 10/566* (2013.01); *Y02E 70/30* (2013.01); *Y10T 307/352* (2015.04)

(58) Field of Classification Search
  USPC .............................. 307/24, 43; 700/286, 291
  See application file for complete search history.

(56) References Cited

FOREIGN PATENT DOCUMENTS

| | | |
|---|---|---|
| JP | 2002-233077 | 8/2002 |
| JP | 2003-339120 | 11/2003 |
| JP | 2004-156820 | 6/2004 |
| JP | 2005-39951 | 2/2005 |
| JP | 2005-235483 | 9/2005 |

OTHER PUBLICATIONS

Supplementary European Search Report for corresponding European Application No. 10838771.3 dated Apr. 26, 2013.

ELECTRIC POWER SUPPLY SYSTEM

FIELD OF THE INVENTION

The present invention relates to an electric power supply system which distributes a power to buildings in a specific area.

BACKGROUND OF THE INVENTION

Conventionally, there has been proposed a technology in which houses are grouped and power supplied to the houses is cooperatively adjusted therebetween within the group. Patent Document 1 discloses a technology for distributing power supplied from an electric company, wherein a power supply control device is provided between the entire houses included in a group and a power system through which the electric company supplies power. Further, the power supply control device monitors an amount of electric power demand in the houses to adjust the power supply-demand balance.

In the technology disclosed in Patent Document 1, it is assumed that a distributed power source such as a micro gas turbine power generation device, a photovoltaic power generation device, a wind power generation device and a fuel cell is provided in at least some of the houses in the group. Thus, the power supply control device has a function of collectively selling surplus power generated by the distributed power source to the electric company, and a function of collectively purchasing insufficient power of the houses from the electric company. Further, if the power to be supplied to the entire houses of the group is insufficient, the power supply control device collectively receives power from the electric company and distributes the power to each of the power demand houses.

That is, since the power supply control device has a function of distributing the power of the distributed power source provided in a group to the houses of the group, it is possible to reduce the amount of power supplied from the electric company.

On the other hand, in Patent Document 2, there has been proposed a photovoltaic power generating and supplying system for grid connection including a plurality of power generation load units each having a solar cell, a DC to AC conversion unit and an AC load, and a single control center including a common storage cell and a storage control unit, the power generation load units connecting the single control center. Further, the control center is connected to a power system provided by an electric company. The DC to AC conversion unit has a function of converting a DC power generated by the solar cell into an AC power and supplying the AC power to the AC load and the storage control unit.

In the technology disclosed in Patent Document 2, the control center monitors the excess or deficiency of power in each of the power generation load units, stores power in the common storage cell when there is surplus power, and feeds power to the power generation load units from the common storage cell when the power is insufficient. Further, the control center detects the amount of the power stored in the common storage cell, receives power from the power system when the power stored is insufficient, and causes a reverse power flow to the power system from the common storage cell when there is a surplus in the power stored.

In the technology disclosed in Patent Document 2, the solar cell corresponds to the distributed power source, and the power generation load units can be regarded as the houses on the power demand side. Further, the houses connected to the control center can be regarded as a group.

In other words, in the configuration described in Patent Document 2, the distributed power source is provided in the group including the power demand houses, and the power supply from the power system provided by the electric company and the reverse power flow to the power system are collectively controlled by the center device, in the same way as the configuration described in Patent Document 1.

[Patent Document 1] Japanese Patent Application Publication No. 2002-10499

[Patent Document 1] Japanese Patent Application Publication No. 2002-233077

As mentioned above, by using the technologies described in Patent Documents 1 and 2, the power generated by the distributed power source can be used in the power demand houses of the group, and there is a connection point for grid connection of the power system provided by the electric company and the power generated by the distributed power source.

Further, in the configurations described in Patent Documents 1 and 2, since the electric company cannot notice the amount of the power generated by the distributed power source or the amount of the power consumed in each house, it cannot determine an electricity charge of each house. In other words, the amount of the power supplied from the power system and the amount of the power reversely flowing to the power system are perceived only by the power supply control device or the control center relaying between the power system provided by the electric company and the power demand houses.

In the technologies described in Patent Documents 1 and 2, however, it is possible to perceive the amount of the power supplied to the power supply control device or the control center and the amount of the power reversely flowing from the power supply control device or the control center. Accordingly, the electric company can collect electricity charges based thereon without providing a power meter in each house.

On the other hand, in the power demand houses, the more the amount of the power used, the larger the amount of the power accommodated by other house. Therefore, if each house individually makes a contract with the electric company, it is impossible to employ the technologies of Patent Documents 1 and 2.

SUMMARY OF THE INVENTION

In view of the above, the present invention provides an electric power supply system capable of measuring an amount of a power received by each house on the power demand side from a commercial power source while reducing an amount of a power received from the commercial power source.

In accordance with an aspect of the present invention, there is provided an electric power supply system including: a common power source which includes a storage cell, and supplies a power to the storage cell from buildings and from the storage cell to the buildings via a local power grid installed in a specific area including the buildings; a distributed power source which is provided in at least some of the buildings in the area, for supplying a power to the buildings and supplying a surplus power to the common power source; a first power meter which is provided in each of the buildings, for measuring an amount of a power supplied from a commercial power source; a second power meter which is provided in each of the buildings, for measuring amounts of power supplied from and to the common power source via the local power grid; and a distribution control device which distributes a power from the common power source to the area on the basis of the amounts of power measured by the first power meter and the second power meter.

Herein, the local power grid serves as a grid connection of a power system of the commercial power source and the respective buildings; and the common power source has a function of storing a power in the storage cell which is received via the local power grid from the buildings and supplying a power to the buildings from the storage cell via the local power grid. Further, the distribution control device performs a management so that the amount of the power supplied to the common power source is coincide with the amount of the power supplied from the common power source in each of the buildings, the management including supplying a power from the common power source when the amount of the power measured in a unit period by the first power meter is equal to or greater than a prescribed value and returning a power to the common power source when the amount of the power measured in a unit period by the first power meter is less than a return value, in each of the buildings, the return value being a value lower than the prescribed value.

With the above configuration, since the common power source shared by the buildings in a specific area is provided an a power is supplied from the common power source to the building in which an amount of a power purchased from the commercial power source has increased, it is possible to suppress the amount of the power supplied from the commercial power source. For example, if the contract power is set in each of the buildings, by equalizing the power demand by the common power source, it is possible to prevent the power demand in each of the buildings from exceeding the contract power.

In addition, since some of the buildings in the area include the distributed power source, the power generated by the distributed power source is used in the buildings and a surplus power is stored in the storage cell provided in the common power source. Accordingly, the power stored in the common power source can be commonly used in the buildings in the area. Moreover, an amount of power corresponding to the amount of the power supplied from the common power source is returned using the distributed power source or the commercial power source, so that the amount of the power supplied to the common power source becomes coincide with the amount of the power received from the common power source in each of the buildings. Therefore, the amount of the power purchased from the commercial power source in each of the buildings is approximately equal to that when the common power source is not provided.

Further, a unit price of the power supplied from the commercial power source may be set in multiple stages, and the distribution control device may control charging and discharging of the storage cell based on the unit price.

BRIEF DESCRIPTION OF THE DRAWINGS

The objects and features of the present invention will become apparent from the following description of embodiments, given in conjunction with the accompanying drawings, in which.

DETAILED DESCRIPTION OF THE EMBODIMENTS

Figure 1:
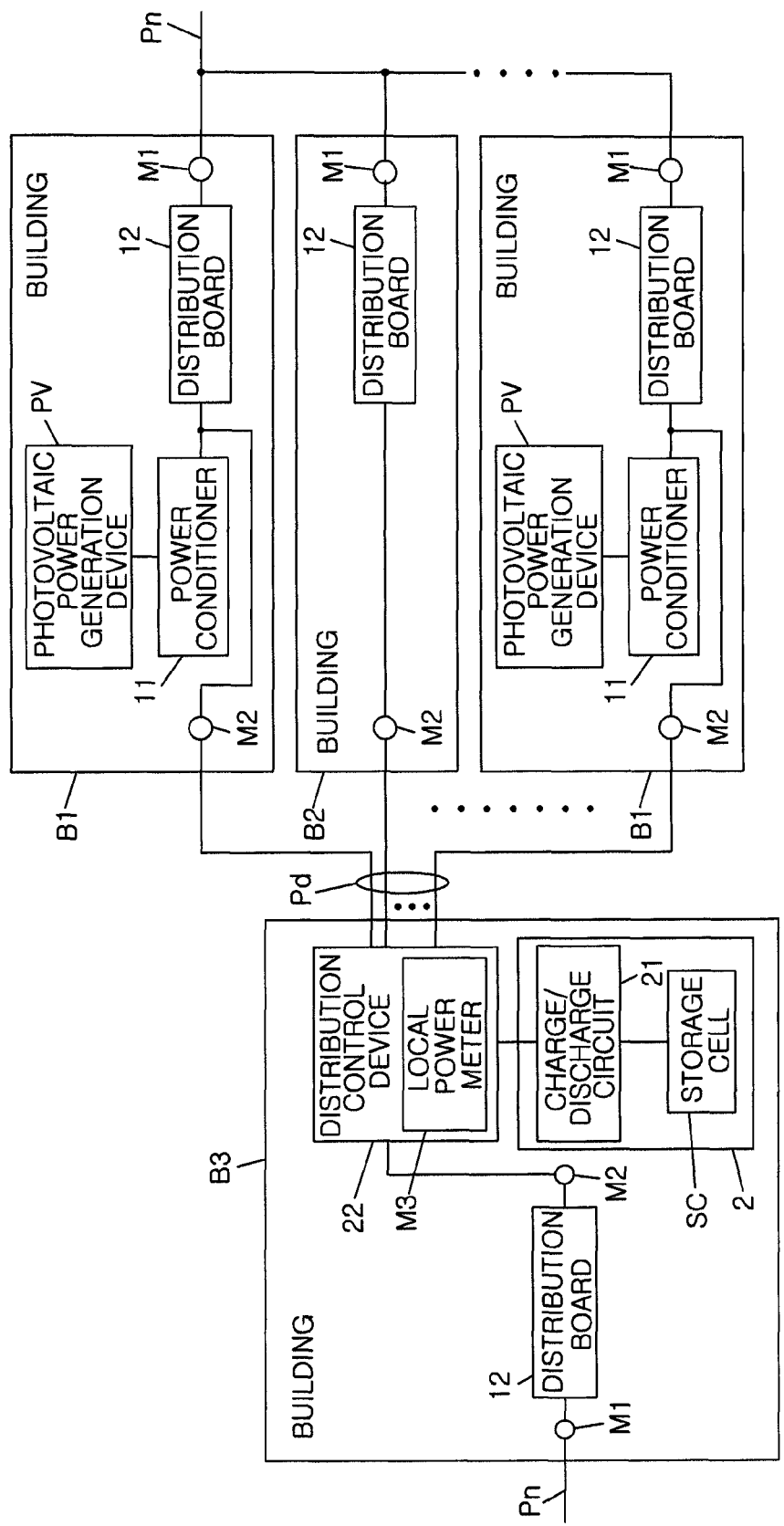
FIG. 1 is a block diagram showing an electric power supply system in accordance with an embodiment of the present invention.

Hereinafter, embodiments of the present invention will be described in detail with reference to the accompanying drawings which form a part hereof. Throughout the specification and drawings, like reference numerals will be given to like parts having substantially the same function and configuration, and a redundant description thereof will be omitted.

In the embodiment to be described below, it is assumed that there are multiple buildings in an area such as a town. Each building may be a detached house, multiple dwelling house or the like. As shown in FIG. 1, at least some of buildings B1 to B3 in the area (hereinafter also referred to as buildings B if it is not necessary to individually identify buildings B1 to B3) include a distributed power source such as a photovoltaic power generation device PV. In the illustrated example, although some of the buildings B include the photovoltaic power generation device PV, the photovoltaic power generation device PV may be provided in each of the buildings B.

The building B1 including the photovoltaic power generation device PV is provided with a power conditioner 11 which converts an output of the photovoltaic power generation device PV into an AC power, and allows to make a grid connection with a power system Pn of a commercial power source. Each of the buildings B1 to B3 is provided with a distribution board 12 to supply a power to each load, and the grid connection of the power system Pn and the power conditioner 11 is carried out in the distribution board 12.

In the present embodiment, the photovoltaic power generation device PV has been mentioned as an example of the distributed power source, but a power generation device using natural energy such as wind power, a micro gas turbine power generation device, a cogeneration device such as a fuel cell to generate power and heat, as long as it can be used as a power generation device, may be used as the distributed power source in any form.

Figure 2:
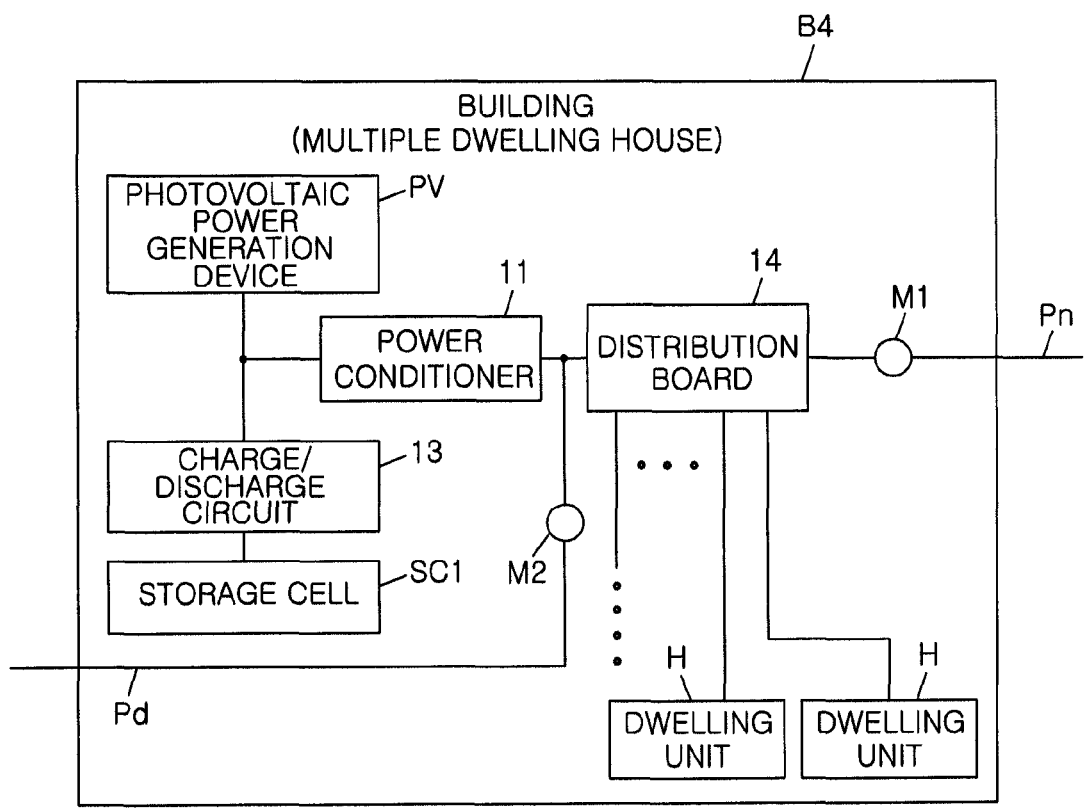
FIG. 2 is a block diagram illustrating a case where the building is a multiple dwelling house in the embodiment of the present invention.

In a case where the building is a multiple dwelling house, as shown in FIG. 2, it is preferable that a storage cell SC1 is provided in addition to the photovoltaic power generation device PV serving as a distributed power source, and the photovoltaic power generation device PV and the storage cell SC1 are shared by dwelling units H of a building B4 that is a multiple dwelling house. The storage cell SC1 is provided to store a surplus power when a power is supplied to the dwelling units H from the photovoltaic power generation device PV. Further, the power stored in the storage cell SC1 may be supplied to the dwelling units H. To that end, a charge/discharge circuit 13 is provided to perform charging and discharging of the storage cell SC1.

In the building B4 of multiple dwelling house, the photovoltaic power generation device PV is provided and, accordingly, the power conditioner 11 is also provided. The power conditioner 11 converts not only a DC power from the photovoltaic power generation device PV but also a DC power from the storage cell SC1. Further, there is provided a distribution board 14 to distribute a power to the dwelling units H in the building B4.

In the building B4 including multiple dwelling units, the contract power for power demand may be set by a collective agreement of the dwelling units of the building B4. In this case, the power conditioner 11 feeds a power to the dwelling units H from the photovoltaic power generation device PV and the storage cell SC1 such that the power demand in the whole building B4 does not exceed the contract power. In other words, while the photovoltaic power generation device PV generates a power, the power conditioner 11 supplies the power of the photovoltaic power generation device PV to the dwelling units H, and stores a power in the storage cell SC1 if there is a surplus power. Further, the power conditioner 11 monitors the power demand in the whole building B4, and feeds the power of the storage cell SC1 to the dwelling units H when the power demand reaches a prescribed value that is set on the basis of the contract power.

Meanwhile, a common power source 2 that is commonly used in the area is provided, e.g., in the building B3. The common power source 2 includes a storage cell SC and a charge/discharge circuit 21 to perform charging and discharging of the storage cell SC. Receiving a power in the common power source 2 and feeding a power from the common power source 2 are performed by a distribution control device 22. In the illustrated example, although the common power source 2 is provided in the building B3 such as a municipal hall or a meeting place of the area is assumed as the building B3, the common power source 2 is not installed necessarily in such building, and the common power source 2 may be provided separately.

A local power grid Pd is connected to each of the buildings B1 to B4 in the area, separately from the power system Pn of the commercial power source. The local power grid Pd is installed between the distribution control device 22 and the buildings B1 to B4. Accordingly, the distribution control device 22 has a function of individually performing the distribution of power between the common power source 2 and each of the buildings B1 to B4. Additionally, in the building B3, a power line equivalent to the local power grid Pd is provided between the distribution control device 22 and a power meter M2 within the building B3.

In each of the buildings B1 to B4, two types of power meters M1 and M2 are provided. One power meter, i.e., the power meter M1, measures an amount of a power that has been received from the power system Pn of the commercial power source. The other power meter, i.e., the power meter M2, measures an amount of a power that has been supplied from/to the common power source 2 through the local power grid Pd.

In each of the buildings B1 to B4, the power meter M2 has a function of measuring an amount of a power supplied to the common power source 2 as well as an amount of a power received from the common power source 2. That is, the power meter M2 of each of the buildings B1 to B4 has a function of measuring a power in bi-directionally.

The amounts of the power measured by the power meters M1 and M2 are forwarded to the distribution control device 22. That is, the distribution control device 22 obtains the amounts of the power by communicating with the power meters M1 and M2. As a communications channel, in addition to a dedicated wired communications channel, the local power grid Pd to which the power line carrier communication technology can be employed may be used, and a wireless communications channel may also be used.

In this embodiment, a reverse power flow to the power system Pn of the commercial power source is not considered. Further, when a power outage occurs in the commercial power source, the power system Pn is removed and an autonomous operation may be performed within the local power grid Pd.

With the above-described configuration, even when there are multiple buildings B1 including the photovoltaic power generation device PV, a storage cell need not to be provided in each of the buildings B1. That is, the storage cell SC can be shared by the buildings B1 each including the photovoltaic power generation device PV. Therefore, in a system in which a power is stored when there is a surplus in the power generated by the photovoltaic power generation device PV and the stored power is fed when the amount of the power generation is reduced, there is no need to provide the storage cell in each of the buildings B1, and it is possible to reduce the locations where the storage cell is provided. Further, by commonly using the storage cell, it is possible to reduce the costs compared to a case where an individual resident purchases a storage cell.

Herein, since the storage cell SC is commonly used in the buildings B1 to B4, it is necessary to make the amount of the power used in each of the buildings B1 to B4 equivalent to that when the storage cell SC is not commonly used. Accordingly, the amount of the power stored to the storage cell SC and the amount of the power used from the storage cell SC are measured by the power meter M2, and the measured amount of power is notified from the power meter M2 to the distribution control device 22.

The distribution control device 22 manages the use of the storage cell SC by using the amount of the power measured by the power meter M2 of each of the buildings B1 to B4. Further, the distribution control device 22 is provided with a local power meter M3 which measures an amount of a power stored in the storage cell SC from each of the buildings B1 to B4 using the common power source 2 and an amount of a power supplied to each of the buildings B1 to B4 from the storage cell SC. The amount of the power measured by the local power meter M3 is used in order to obtain an amount of a power that has been lost in the power conversion and transmission.

In other words, ideally, the total amount of the power measured by the power meters M2 of the buildings B1 to B4 is equal to the amount of the power measured by the local power meter M3, but actually, there occurs a difference corresponding to a loss in the amount of the power. By calculating the difference, the power loss in the use of the common power source 2 can be taken into consideration. This makes it possible to equally distribute the power of the common power source 2 to the buildings B1 to B4.

Generally, a unit price on electricity charges of the commercial power source is determined based on the contract power, which has been set on the basis of a maximum value of the power demand in one month, the power demand being an average value of the amount of power used every 30 minutes. For that reason, in each of the buildings B1 to B4, it is desirable to suppress the maximum value of the power demand measured by the power meter M1.

Then, the distribution control device 22 calculates the power demand in each of the buildings B1 to B4 by obtaining the amount of power consumed in each of the buildings B1 to B4 being measured by the power meter M1 (the amount of power used can be used as a value proportional to the power demand in case of obtaining the amount of power used every 30 minutes). If the power demand in one of the buildings B1 to B4 reaches a prescribed value (an appropriate power value set to be lower than the contract power), the distribution control device 22 supplies the corresponding one of the buildings B1 to B4 with a power from the common power source 2 to prevent the power demand from exceeding the contract power.

The power from the common power source 2 can be also supplied to the buildings B2 and B3 not including the photovoltaic power generation device PV as well as the buildings B1 and B4 including the photovoltaic power generation device PV.

If the building B1 or B4 including the photovoltaic power generation device PV has stored a power in the storage cell SC and the stored power remains, it can be used freely. Further, even if there is no amount of power remaining in the storage cell, it is possible to receive a power from the common power source 2 if there is a surplus power in the storage cell SC. On the other hand, even in the buildings B2 and B3 not including the photovoltaic power generation device PV, it is possible to receive a power from the common power source 2 if there is a surplus power in the storage cell SC. Thus, in any one of the buildings B1 to B4, it is possible to receive a power from the common power source 2 when the power demand reaches the prescribed value, thereby preventing the power demand from exceeding the contract power.

If a power is stored in the storage cell SC by the buildings B1 and B4 including the photovoltaic power generation device PV and the buildings B1 and B4 uses a larger amount of the power than an amount of the stored power, it is possible to perform charging of the storage cell SC when there is a surplus in the power generated by the photovoltaic power generation device PV provided in the buildings B1 and B4. That is, the amount of the power received from the common power source 2 can be returned to the common power source 2 when there is a surplus power.

Herein, it is desirable to set a deadline such that the amount of the received power and the amount of the returned power are offset within an appropriate period. The deadline can be set in units such as one day, one week, one month and one year. If it is impossible to offset the received power within the deadline, it is preferable that the power purchased from the power system Pn is used for charging of the storage cell SC to offset the received power.

On the other hand, if the common power source 2 has been used by the buildings B2 and B3 not including the photovoltaic power generation device PV, charging of the storage cell SC is performed by the power purchased from the power system Pn when the power demand is lowered to a return value set to be lower than the prescribed value. In other words, in the buildings B2 and B3, it is possible to prevent the power demand from exceeding the contract power by using the common power source 2, and charging of the storage cell SC is performed by the power purchased from the commercial power source when the power demand is lowered. In this case, the amount of power measured by the power meter M1 is equal to that when the common power source 2 is not used. Therefore, in the buildings B2 and B3, the increase in electricity charges is suppressed by preventing the power demand from exceeding the contract power, and the electricity charges commensurate with the amount of power used are paid to an electric company.

The unit price of electricity charges on the power supplied from the commercial power source may be set in multiple stages according to time zones of using the electricity. In this case, when a power is used from the common power source 2 and then returned thereto by using the power purchased from the commercial power source, it is possible to use the power purchased in the time zone when the unit price of electricity charges is low. As a result, it is possible to prevent an increase in electricity charges in each of the buildings B1 to B4 by using the power purchased in the time zone when the unit price of electricity charges is low. Also, in general, the power demand is low in the time zone when the unit price of electricity charges is low, and it is possible to equalize the power supply by increasing the amount of the power used during this time zone.

As described above, according to the embodiment of the present invention, since the common power source 2 is shared by the multiple buildings B1 to B4 in the area, each of the buildings B1 to B4 can use the power stored in the common power source 2 if necessary. In particular, since the buildings B2 and B3 not including the photovoltaic power generation device PV can use the power stored in the storage cell SC, it is possible to prevent the power demand from exceeding the contract power. Accordingly, it is possible to suppress the total electricity charges in the area using the common power source 2.

Besides, since the amount of power stored to the common power source 2 and the amount of power used from the common power source 2 are measured by the power meter M2 in each of the buildings B1 to B4, and collectively managed by the distribution control device 22, the common power source 2 can be used as if the storage cell SC is installed in each of the buildings B1 to B4.

Moreover, in the buildings B2 and B3 not including the photovoltaic power generation device PV, the amount of the power corresponding to the amount of the power supplied from the common power source 2 is purchased from the commercial power source and returned to the common power source 2. Accordingly, the total amount of the power purchased from the commercial power source and measured by the power meters M1 is approximately equal to that when the common power source 2 is not used.

While the invention has been shown and described with respect to the embodiment, it will be understood by those skilled in the art that various changes and modification may be made without departing from the scope of the invention as defined in the following claims.

What is claimed is:

1. A distribution control device for distributing a power from a common power source to an area including buildings,
wherein the common power source includes a storage cell, and is configured to charge the storage cell by using a power received from the buildings via a local power grid installed in the area and to supply a power from the storage cell to the buildings via the local power grid,
wherein the distribution control device is configured to distribute the power from the common power source to the area on the basis of amounts of power measured by a first power meter and a second power meter,
wherein the first power meter is provided in each of the buildings and configured to measure an amount of a power supplied from a commercial power source,
wherein the second power meter is provided in each of the buildings and configured to measure amounts of power supplied from and to the common power source via the local power grid, and
wherein the distribution control device performs a management so that, during a predetermined period, the amount of the power supplied to the common power source from each of the buildings and measured by the second power meter coincides with the amount of the power supplied to each of the buildings from the common power source and measured by the second power meter, the management including supplying a power from the common power source to a building among the buildings when the amount of the power measured in a unit period by the first power meter of the building is equal to or greater than a prescribed value and returning a power to the common power source from the building when the amount of the power measured in the unit period by the first power meter of the building is less than a return value, the return value being a value lower than the prescribed value.

2. A distribution control method for distributing a power from a common power source to an area including buildings,
wherein the common power source includes a storage cell, and is configured to charge the storage cell by using a power received from the buildings via a local power grid installed in the area and to supply a power from the storage cell to the buildings via the local power grid,
wherein the method comprises distributing the power from the common power source to the area on the basis of amounts of power measured by a first power meter and a second power meter,
wherein the first power meter is provided in each of the buildings and configured to measure an amount of a power supplied from a commercial power source,
wherein the second power meter is provided in each of the buildings and configured to measure amounts of power supplied from and to the common power source via the local power grid, and
wherein the distributing includes performing a management so that, during a predetermined period, the amount of the power supplied to the common power source from each of the buildings and measured by the second power meter coincides with the amount of the power supplied to each of the buildings from the common power source and measured by the second power meter, the management including supplying a power from the common power source to a building among the buildings when the amount of the power measured in a unit period by the first power meter of the building is equal to or greater than a prescribed value and returning a power to the common power source from the building when the amount of the power measured in the unit period by the first power meter of the building is less than a return value, the return value being a value lower than the prescribed value.

* * * * *